March 19, 1929.   K. KUPFMULLER ET AL   1,705,926

TRANSMISSION MEASURING APPARATUS

Filed Aug. 25, 1927

INVENTORS: KARL KUPFMULLER
HANS MAYER
DIETWALT THIERBACH
BY *H. A. Burgess*
ATTORNEY Patented Mar. 19, 1929.

1,705,926

UNITED STATES PATENT OFFICE.

KARL KÜPFMÜLLER, OF SCHONEBERG-BERLIN, AND HANS MAYER AND DIETWALT THIERBACH, OF CHARLOTTENBURG-BERLIN, GERMANY, ASSIGNORS TO SIEMENS & HALSKE AKTIENGESELLSCHAFT, OF SIEMENSSTADT NEAR BERLIN, GERMANY, A GERMAN COMPANY.

TRANSMISSION-MEASURING APPARATUS.

Application filed August 25, 1927, Serial No. 215,428, and in Germany September 21, 1926.

This invention relates in general to a method and arrangement for automatically measuring alternating potentials and is applicable chiefly to measuring the attenuation of long distance cable connections.

The increased reliability required of long toll cable connections has made supervisory devices and checking measurements necessary. Among these the so-called poling tests assume an important place. In principle a poling test is made by applying a certain energy $L_o$ to the commencement of a long distance connection (normally 1 milliwatt to a line of impedance $Z=600$) and measuring at the repeater exchanges of the line, that portion $L$ of the impressed energy arriving thereat. From the ratio of the two performances $L_0$ and $L$ the attenuation factor $b$ may be defined as $1/2 \log e \, L/L_0$.

In practice a poling test is carried out by applying to the end of the line a generator with an internal impedance $Z$ and an open circuit voltage of $E_o$ whereupon the voltage $E$ occurring at the repeater exchange is measured. As normally the line shows the impedance $Z=600$ at the repeater exchange also, the attenuation or poling factor $b$ is given by the ratio $$b = \log_e \frac{E}{E_o}.$$

The voltage $E$ at the repeater exchange can be measured, for example, by comparing with an auxiliary voltage which can be produced by an auxiliary transmitter set up at the repeater exchange. Such a measurement requires a large number of handles, which are involved on the one hand by switching over the indicated measuring device to the line and to the auxiliary transmitter, and on the other hand by the regulating of the two voltages to equality. As poling tests must be repeated very often during the operation and must be made simultaneous at all repeater exchanges of a long distance connection, it appears desirable to use an automatically indicating measuring device for this purpose.

Figure 1:
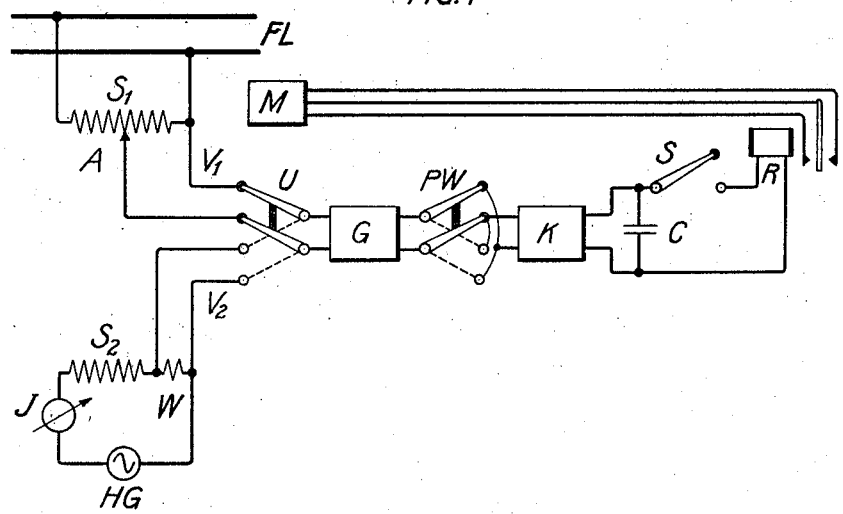

Such an automatic measuring device forms the subject of the invention. This will be explained more closely in conjunction with the basic circuit arrangement of which Fig. 1 shows the general layout and Figs. 2 and 3 curves explaining the operation of this layout. In Fig. 1 FL represents a trunk line at the remote end of which a generator operates so that at a high resistance potentiometer $S_1$, there is produced an alternating potential $E$ of the frequency $w$, which is to be measured. HG represents an auxiliary generator which is either self-energized or can be regulated from the line FL. This generator is first of all so set, for example, that it provides a constant voltage $V_2$. The voltage $V_2$ is preferably so measured that it corresponds to the smallest voltage $E$ arriving at $S_1$.

Figure 2:
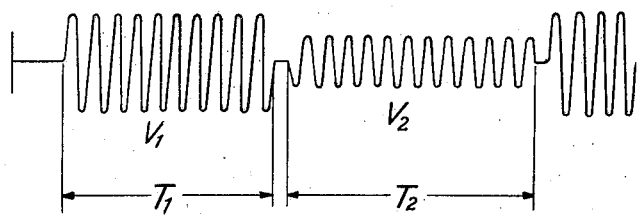

The device contains further a rectifier G, a switch U, a pole changer PW, a condenser C, a relay R and a motor M. By means of a motor, the relay or a stepping mechanism, not shown, the switch U is thrown over at small intervals of time, say 50 per second so that first the voltage $V_1$ taken from the potentiometer $S_1$ and then the known voltage $V_2$ is applied to the input of the rectifying arrangement. The transit time of the switch U should be as small as possible and the time of contact in each position, $T_1$ and $T_2$, must be as large as possible. There is, therefore, at the input of the rectifying arrangement, an alternating potential such as shown in Fig. 2.

The rectifying arrangement G can be the last stage of a circuit, for example, a tube in a rectifier-amplifier circuit. Only the positive half waves of the wave train are present in the output of the rectifier.

Figure 3:
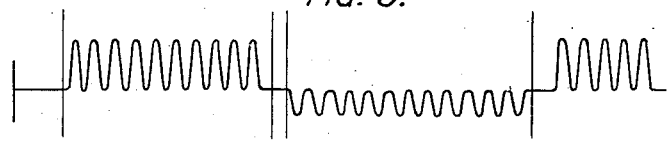

The half waves arriving at the output of the rectifier are impressed on condenser C. The pole changer PW is so coupled to the switch U that the output and input of the rectifier arrangement is commutated simultaneously. The current charging the condenser then has a curve as shown in Fig. 3 that is, condenser C is positively charged during the time $T_1$ while during the time $T_2$ it is negatively charged. If the two potentials $V_1$ and $V_2$ are exactly equal the mean charge of the condenser is equal to 0, that is, the current flowing through the relay contains no direct current components so that, if it is sufficiently inert, it remains at rest. In order that the alternating components contained in the wave train according to Fig. 3, may be kept off the condenser C and the relay R the filter K may be provided.

For the case where the two voltages $V_1$ and $V_2$ are not equally great, the charging currents of the condenser C will, of course, have different values. The direct current components contained in the wave train according to Fig. 3 charge the condenser either positively or negatively. The charge on the condenser is impressed on a polarized relay over a periodically opened and closed contact S so that by any well known method the motor M may be controlled to rotate either right or left. The make and break intervals of the contact S are suitably chosen to be a multiple of the intervals $T_1$ and $T_2$. This is accomplished in a simple manner by the contact S being controlled through mechanism, not shown, from the switch U.

The moving arm A of the potentiometer $S_1$ is coupled to the motor M through suitable mechanism, not shown. The motor shifts this arm until the voltage $V_1$ tapped from it has become exactly equal to the fixed auxiliary voltage $V_2$. At this instant the relay becomes dead and cuts out the motor M. The potentiometer $S_1$, which is suitably calibrated in attenuation units, indicates the desired ratio.

What is claimed is:

1. An electrical measuring circuit comprising a source of voltage to be measured, an auxiliary source of voltage, means for rectifying said voltages, means for impressing said voltages alternately upon said rectifying means, and means controlled by the output of said rectifying means for equalizing said voltages.

2. An electrical measuring circuit in accordance with claim 1 in which said means controlled by the output of said rectifying means comprises a condenser alternately charged from said rectifying means, and a relay operated by the difference in the values of said voltages on said condenser.

3. An electrical measuring circuit in accordance with claim 1 in which said means controlled by the output of said rectifying means comprises a condenser, a relay, and a motor, said motor being controlled by said relay and operated to maintain said first voltage equal to said auxiliary voltage.

4. An electrical measuring circuit comprising a source of voltage to be tested, an electrical source of substantially constant voltage, a rectifier, means for alternatly impressing said voltages on said rectifier, a condenser, means for impressing the output of said rectifier on said condenser in reverse polarity, said polarity being reversed in synchronism with the impression of said voltages on said rectifier, a motor, and a relay for controlling said motor, said relay being operated by the difference in the values of said voltages, said motor operating mechanism to maintain said voltages equal.

5. A method of automatically measuring the changes in a voltage in which said voltage is compared with an auxiliary source of constant voltage, comprising first, rectifying each of said voltages alternately, second, impressing the output of each of said voltages upon a condenser in alternate reverse polarity and in synchronism with the alternate rectification of said voltages, the difference in said output controlling the adjustment of said voltages to equality.

6. A method of automatically measuring a voltage by comparison with an auxiliary standard voltage comprising, first, alternately rectifying said voltages, second, alternately charging a condenser with said voltages in alternate opposite polarity, and third, impressing the difference in the charges of said condenser on mechanism for adjusting said voltages to equality.

7. In an electrical measuring circuit, a voltage to be measured, an auxiliary voltage of constant value, a rectifier, switching means for alternately impressing said voltages on said rectifier, a condenser, a second switching means for alternately impressing the rectified voltages on said condenser in reverse polarity in synchronism with the impression of said voltages on said rectifier, a filter intermediate said condenser and said second switching means for suppressing alternating components in the output of said rectifier, a relay operable by the charge on said condenser, and motor means controlled by said relay for adjusting the value of said voltage to equal that of said auxiliary voltage.

In witness whereof, we hereunto subscribe our names this 3rd day of August, A. D. 1927.

KARL KÜPFMÜLLER.
HANS MAYER.
DIETWALT THIERBACH.